US008406463B2

(12) United States Patent
Quinn et al.

(10) Patent No.: US 8,406,463 B2
(45) Date of Patent: Mar. 26, 2013

(54) METHOD AND SYSTEM FOR DYNAMIC SPEED CONTROL ON A MAIL PROCESSING SYSTEM

(75) Inventors: Daniel C. Quinn, Hatfield, PA (US); Robert J. Elias, Lansdale, PA (US); Gregory J. Norton, Laurys Station, PA (US); John S. Tarascio, Chapel Hill, NC (US)

(73) Assignee: Bell and Howell, LLC, Durham, NC (US)

( * ) Notice: Subject to any disclaimer, the term of this patent is extended or adjusted under 35 U.S.C. 154(b) by 21 days.

(21) Appl. No.: 13/245,360

(22) Filed: Sep. 26, 2011

(65) Prior Publication Data

US 2012/0076352 A1 Mar. 29, 2012

Related U.S. Application Data

(60) Provisional application No. 61/386,845, filed on Sep. 27, 2010.

(51) Int. Cl.
*G06K 9/00* (2006.01)

(52) U.S. Cl. ........................................................ 382/101

(58) Field of Classification Search .................. 382/101
See application file for complete search history.

(56) References Cited

U.S. PATENT DOCUMENTS

| | | | | |
|---|---|---|---|---|
| 4,896,823 A * | 1/1990 | Taylor | ........................... | 229/303 |
| 5,893,512 A * | 4/1999 | Diedrich | ...................... | 229/92.1 |
| 6,910,569 B2 * | 6/2005 | Reznik et al. | ................. | 198/444 |
| 2011/0121064 A1 * | 5/2011 | Van Gorp et al. | ............. | 229/305 |

FOREIGN PATENT DOCUMENTS

JP 2007-022592 * 2/2007

* cited by examiner

*Primary Examiner* — Tom Y Lu

(74) *Attorney, Agent, or Firm* — McDermott Will & Emery LLP

(57) ABSTRACT

The present application relates to a mail processing system and related method containing dynamic speed control which uses real time and historical system parameters to dynamically control the cycle speed of an inserting or wrapping system to optimize system efficiency, and maximize throughput and performance. A document processing system with dynamic speed control analyzes system parameters. When the operational conditions are favorable the system will increase cycle speed of one or more of the mail processing components of the system in increments until an optimal speed is reached. Likewise, if conditions are unfavorable the system will decrease cycle speed of one or more of the mail processing components of the system in increments until an optimal speed is reached.

22 Claims, 5 Drawing Sheets

METHOD AND SYSTEM FOR DYNAMIC SPEED CONTROL ON A MAIL PROCESSING SYSTEM

CROSS-REFERENCE TO RELATED APPLICATIONS

This application claims the benefit of U.S. Provisional Application No. 61/386,845 entitled "METHOD AND SYSTEM FOR DYNAMIC SPEED CONTROL ON AN INSERTING SYSTEM" filed on Sep. 27, 2010, the disclosure of which is entirely incorporated herein by reference.

TECHNICAL FIELD

The present subject matter relates to techniques and equipment to insert or wrap documents and inserts into an envelope to form mail documents using dynamic speed control to optimize system efficiency and maximize throughput.

BACKGROUND

Current mail document inserting systems are designed to run at a single cycle speed that is fixed by the system design. Since the material and production characteristics of documents, inserts and envelopes, which together form a mail document, can effect the system performance, the cycle speed (rate at which the inserting system cycles, assuming no stoppage) must be set at a speed compatible with the most difficult mail document to process. This fixed cycle speed has been partially overcome by adding a manual cycle speed adjustment that the operator can set during a production job. However, the operator may not consider all of the parameters that could affect system performance for the job and only adjusts the manual setting based on the most difficult mail document in the production job. As a result, the optimal system cycle speed and resulting maximum throughput can not be achieved.

Hence a need exists for an inserting or wrapping system with dynamic speed control that tracks and monitors system performance and dynamically changes the inserting or wrapping systems cycle speed to maintain optimal performance. When material set sizes are large the system will reduce its speed to allow the sets to be completed and presented to the system's base track, and eliminate multiple cycling of empty track sections. The system will recognize and analyze system performance. As the mail processing system is running without faults over time it will increase its cycle speed in increments to achieve and maintain the most effective system performance. When the operational conditions are favorable the system will increase its cycle speed in increments until an optimal speed is reached. Likewise, if conditions are unfavorable the inserting system will decrease its cycle speed in increments until an optimal speed is reached.

SUMMARY

The teachings herein alleviate one or more of the above noted problems by providing an automated method for dynamically controlling cycle speed on a mail processing system during a mail production job. The method includes loading dynamic cycle speed control parameters onto the mail processing system. The dynamic cycle speed control parameters are obtained during setup of the mail production job. The mail production job is initialized on the mail processing system, and the mail production job includes a plurality of document materials to be assembled into a plurality of mail documents reading a reference code or control code from at least one of the document materials for accessing control instructions for at least one mail processing equipment component of the mail processing system during assembly of the at least one document material into a mail document. Cycle speed of at least one of the mail processing equipment components is dynamically adjusted based on one or more of: characteristics of the at least one document material during assembly, target production goals of the mail production job, or mail production job error information collected during assembly of the at least one document material by one or more of the mail processing equipment components.

It is further desirable to provide an automated method for dynamically controlling cycle speed on a mail processing system during a mail production job. The method includes loading dynamic cycle speed control parameters onto the mail processing system. The dynamic cycle speed control parameters are obtained during setup of the mail production job. The mail production job is initialized on the mail processing system, and the mail production job includes a plurality of document materials to be assembled into a plurality of mail documents reading a reference code or control code from at least one of the document materials for accessing control instructions for at least one mail processing equipment component of the mail processing system during assembly of the at least one document material into a mail document. Cycle speed of at least one of the mail processing equipment components is dynamically adjusted based on one or more of: characteristics of the at least one document material during assembly, target production goals of the mail production job, or mail production job error information collected during assembly of the at least one document material by one or more of the mail processing equipment components. Upon completion of the mail production job, historical data relating to the dynamic speed control parameters accumulated during the mail production job run is uploaded to a computer of the mail processing system for use in setup of an additional mail production job.

It is yet further desirable to provide a mail processing system configured with dynamic cycle speed control. The system, such as an inserting or wrapping system includes a mechanism for transporting a plurality of document materials along a plurality of mail processing equipment components positioned along the mechanism. The mail processing equipment components are configured to assemble the plurality of document materials into a plurality of mail documents. A control processor is configured to receive dynamic cycle speed control parameters obtained during setup of a mail production job to be run on the mail processing system. An optical reader reads a control code or reference code from at least one of the document materials for accessing control instructions for the mail processing equipment components. The control processor is configured to dynamically adjust cycle speed of the mail processing equipment components individually or collectively based on one or more of: characteristics of the at least one document material during assembly, target production goals of the mail production job, or mail production job error information collected during assembly of the at least one document material by the mail processing equipment components.

The advantages and novel features are set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations described herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
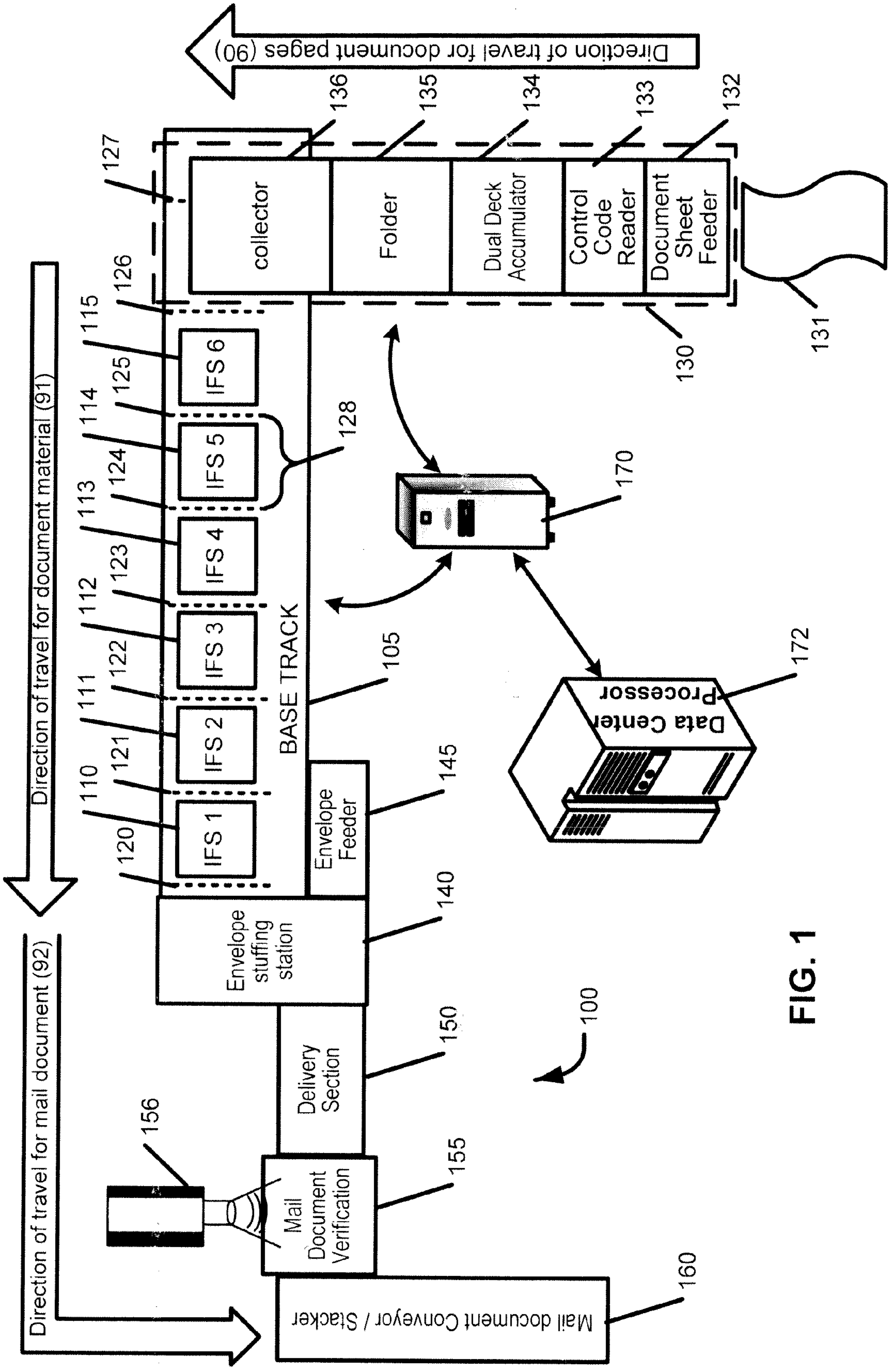
FIG. 1 illustrates an exemplary document processing system configured with dynamic speed control.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The teachings herein alleviate one or more of the above noted problems in the existing art, by providing a document processing system and related method containing dynamic speed control which uses real time and historical system parameters to dynamically control the cycle speed of an inserting or wrapping system to optimize system efficiency and maximize throughput and performance.

A document processing system with dynamic speed control analyzes system parameters such as application parameters, page distribution, fault time, and error/warning history to dynamically control system cycling speed. The system will recognize and analyze system performance. When the operational conditions are favorable the system will increase its cycle speed in increments until an optimal speed is reached. Likewise, if conditions are unfavorable the system will decrease its cycle speed in increments until an optimal speed is reached.

When configured with an input channel the inserting or wrapping system has the capability to automatically change cycle speed to allow for maximum performance. This dynamic change in speed will enable the input device to place material into base track sections, without leaving empty sections, based on set size and system performance (speed increase during low set size distributions and decreases with high page set distribution). This speed change reduces the number of empty track sections from cycling which increases overall efficiency and allows for a slower cycle speed to finish assembling thicker sets.

Dynamic speed control is configurable per job where an operator can select to override the software and default to the operator control of the document processing system cycling speed. An operator selectable menu of dynamic speed control algorithms will exist for each job. An operator programs a job with dynamic speed control either enabled (ON) or disabled (OFF). If a job is selected with dynamic speed control enabled, the system will initiate this action. An initial target speed is determined based on system parameters. The document processing system is run and performance is continuously gathered and analyzed. Based on this analysis, the system cycle speed is increased or decreased. The system parameters can be fined tuned by the operator as needed (password protected).

With respect to a specific document processing system, such as an inserting system, features associated with dynamic speed control include, but are not limited to, software and hardware features that dynamically increase or decrease the inserting system cycle speed based on performance and set size distribution. Inserting system speed which dynamically increases or decreases in order to adapt to processing conditions. When the operational conditions are favorable the inserting system will increase its cycle speed in increments until an optimal speed is reached. Likewise if conditions are unfavorable the inserting system will decrease its cycle speed in increments until an optimal speed is reached. When configured with a cut sheet feeder or continuous form input, the inserting system will dynamically change cycle speed to allow for maximum performance calculated against set size distribution. Inserting system cycle speed will increase for small set sizes and decrease when assembling larger set sizes. This dynamic change in speed enables the input feeder to complete assembling sets, and place document materials into track sessions without allowing the inserting system to cycle with empty track sections. The inserting system is configured to recognize and analyze system performance. As the inserting system is running without faults over time it will increase its cycle speed in increments to achieve and maintain the most effective system performance. When the operational conditions are favorable the inserting system will increase its cycle speed in increments until an optimal speed is reached. Likewise, if conditions are unfavorable the inserting system will decrease its cycle speed in increments until an optimal speed is reached. Dynamic speed control is configurable per job where an operator can select to override the software and default to the operator control of the inserting system cycling speed. An operator selectable menu of dynamic speed control algorithms exists for each job.

The document processing system uses real time and historical system parameters to dynamically control the cycle speed to optimize system efficiency, and maximize throughput and performance. The parameters include, but are not limited to application information, such as document material type, document material dimensions, print orientation, feed orientation, collation direction, fold type, accumulation mode, set size distribution, and reading symbology. With respect to document processing system setup parameters, the following include: input feeder parameters, reading parameters, function mark setup, insert feeder parameters, envelope parameters and mail document delivery parameters. Error and warning historical parameters include, but are not limited to: feeder fault types, read errors, module jams/errors, base fault types (e.g., insert feeder misses or doubles, envelope feeder misses or jams, stuffing station jams), mail document delivery fault types such as diverted mail documents, module jams/errors, output conveyor mail documents. Operator set point parameters include, but are not limited to target production job goal, target document processing system efficiency, job selection, dynamic speed control algorithms and error recovery options.

Reference now is made in detail to the examples illustrated in the accompanying drawings and discussed below. FIG. 1 illustrates a document processing system 100, such as an inserting system, is configured for dynamic speed control operation. The inserting system may be, but is not limited to, the Bell and Howell ENDURO® or COMBO® inserting systems or Bell and Howell Enveloper® wrapping system. An example of a wrapping system is described in U.S. Pat. App. Pub. No. 2011/0121064, which is incorporated by reference in its entirety.

Figure 3:
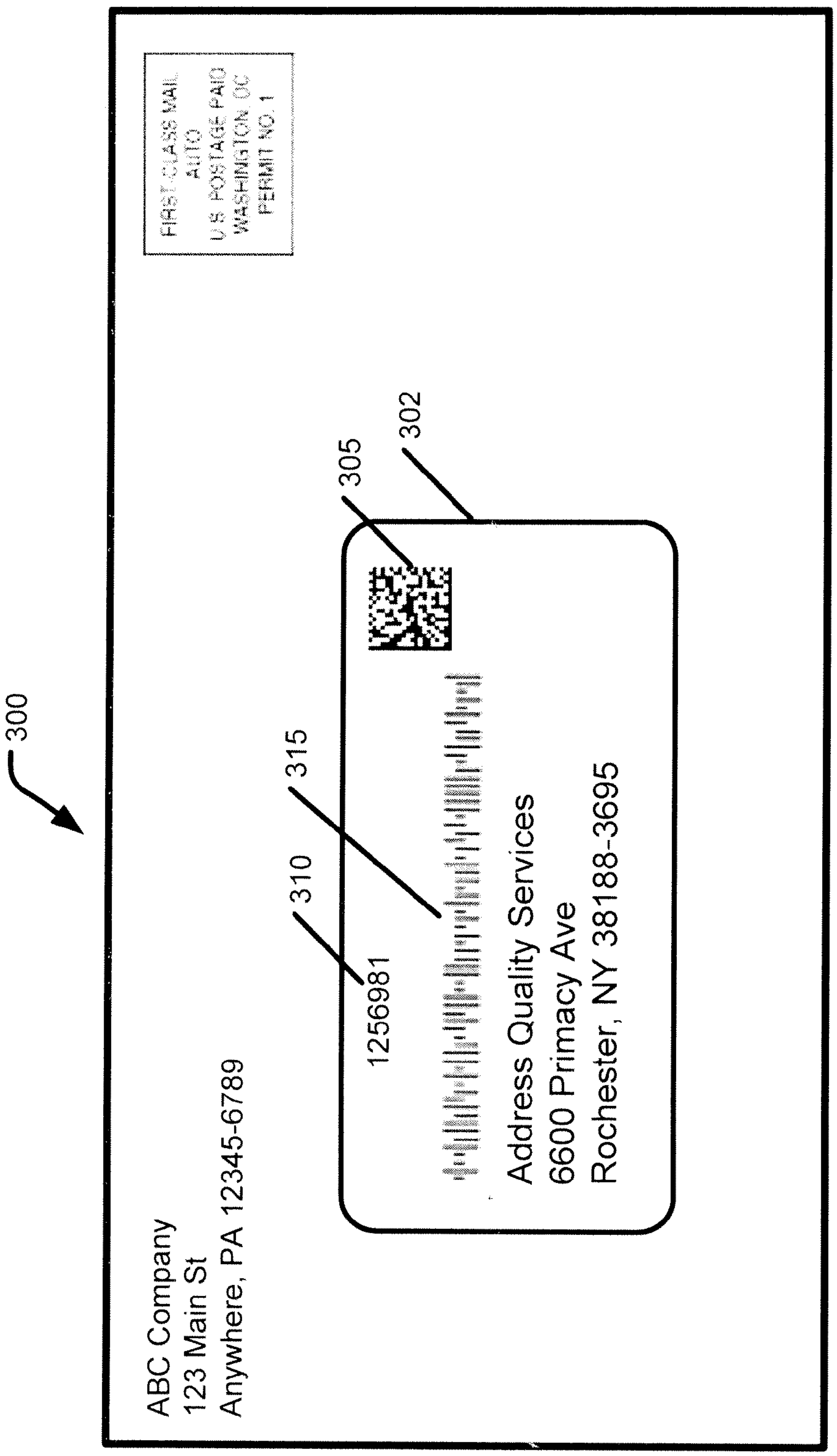
FIG. 3 is an illustration of a completed mail document.

The backbone of an inserting system is the base track 105 which transports the partially assembled document material to be stuffed in an envelope. The partially assembled document material may consist of a document plus inserts. The material is moved down the base track 105 in direction 91 by fingers 120 through 127 which are attached to a continuous chain or belt to form track sections 128 between each of the finger pairs. The fingers may move in a continuous motion or may be indexed for each machine cycle. Attached to the base track 105 is the input channel 130 that provides documents consisting of one or more pages to the base track 105. The input channel 130 processes and transports the document pages from the document sheet feeder 132 to the collector 127 in the direction 90. Multiple input channels may be attached to the base track 105. The input channel 130 processes cut sheet or fan folded document pages 131 with a document feeder 132. Alternately the document pages may be printed on a paper roll and fed into a cutter assembly that will separate the document into individual pages. The inserting system 100 operation may be controlled by reading a control code 305 FIG. 3 which is read with a control code reader 133. The control code 305 may contain the inserting instructions or a reference to a data file maintained in the control computer 170. The control computer 170 may be connected to a data center processor 172 to receive job data and supply job results. Those skilled in that art may use other formats for the control code other than the 2-D barcode 305 shown in FIG. 3. Other barcodes may include the USPS Intelligent Mail barcode 315 (1 Mb) and Optical Mark Recognition (OMR) codes. When the 1 Mb includes a unique number encoded in the barcode, this unique number can be used as a reference code to reference a control data file in the control computer 172. Similarly, unique alpha-numeric data such as a sequence number 310 can be used as a reference code to reference a control data file in the control computer 172. The use of a control code to define the characteristics of the mail document contents is referred to as database driven insertion. FIG. 3 illustrates a completed envelope 300 where the control code 305 is visible through the address block window 302. Visibility through the window 302 is not a requirement since control codes located in other positions on the document page can be read by the control code reader 133. The contents of the envelope, whether using preformed envelopes or wrapped envelopes, may contain a document of one or more pages and inserts such as but not limited to coupons, advertisements and return envelops. The contents of the envelope are referred to as document material and the finished envelope is referred to as a mail document 300.

The data associated with the control code may specify parameters that affect the performance of the input channel 130. These parameters include, but are not limited to, document page count, paper thickness, fold type and inserts required. Dynamic speed control takes these parameters into account on a document by document basis. By way of example, as the number of pages in a document increase the longer the dual deck accumulator 134 will take to accumulate the document pages. The accumulator configuration such as over accumulate (first page on the bottom) runs faster that under accumulate (first page on top). By way of further examples the document page count and material thickness will affect input channel throughput since the folder 135 will take longer to fold a large page count document with thick paper. The type of fold also impacts throughput of the input channel since letter folds, Z folds and ½ folds require variable times to complete. With the largest documents, the folder 135 may require multiple cycles and the collector 136 is then used to collect each folder output. When the collector 136 is finished with the document, the collector will place the document into a track section 128 on the base track. Dynamic speed control adjusts either the finger 120-127 speed by slowing the drive or by decreasing the indexing cycle time to minimize the possibility that a track section 128 will not receive a document. Some track sections may be missed due to performance considerations of down track processes where too slow a speed or too long of a cycle time may result in jams or other faults. However, the document processing system throughput will be maximized since each document in the input channel will be produced as quickly as possible thus keeping the base track 105 running as fast as possible on a document by document basis.

The base track 105 generally has one or more insert feeder stations (IFS) 110 through 115 to add additional document material to the total material to be stuffed into the envelope and form a completed mail document. The document processing system setup has defined the characteristics of the material in each insert feeder station and the control code defines which documents get an insert from a given insert feeder station 110-115. The time required to place an insert onto the track section 128 is dependant on the characteristics of the insert. By way of example, a single sheet can be placed quicker than a heavy booklet. Since which inserts are to be added to which document varies depending on the control code data, the time required to feed an insert is variable. The base track speed or cycle time is adjusted for each insert to be added to a document in a given track section. Depending on the inserting system design the insert feeder stations can feed independently or in a group based on a machine cycle. For the illustration in FIG. 1 all six insert feeder stations will be controlled to collectively slow down when a booklet is fed onto a track section.

The mail document 300 is completed when the contents of a track section 128 is stuffed into an envelope from the envelope feeder 145 by the envelope stuffing station 140. Dynamic speed control will adjust the cycle rate based on the parameters of the material in a track section 128 and the type of envelope used. Thicker stacks of material generally require additional time to stuff into an envelope. The envelope size also is a factor. The delivery section 150 also impacts the throughput depending on the functions that are added to this section. Postage meters, with and without a scale, plus printers with a variable amount of printing required are two examples of features that are accounted for in dynamic speed control.

Mail document verification 155 uses an optical reader such as a camera to image each mail document for defects. For example, an out of order sequence number 310 (FIG. 3) may indicate an improperly cleared and accounted for jam stoppage. Mail document verification 155 assesses many additional error checks that are well known by those skilled in the art. In addition the control computer 170 monitors each subsection of the inserting system 100 to compile error data. When error rates increase the throughput is reduced and when low error rates occur the throughput may be increased above the production target rate with incremental steps. Error and warning historical parameters include, but are not limited to: feeder fault types, read errors, module jams/errors, base fault types (e.g., insert feeder misses or doubles, envelope feeder misses or jams, stuffing station jams), mail document delivery fault types such as diverted mail documents, module jams/errors, output conveyor mail documents.

The completed mail documents 300 are collected on the mail document conveyor/stacker 160 for sweeping into mail trays. The direction of travel 92 of the mail documents is from the envelope stuffing station 140 to the mail document conveyer/stacker 160 as shown by arrow 92.

The dynamic speed control operates in a basic mode and in a system mode is now described. With the base dynamic speed control, the inserter or wrapper is configured to respond to and making dynamic cycle speed changes based on operational conditions. The dynamic speed control is configured to make adjustments to the base track 105 (FIG. 1), insert feeder stations 110 through 115 and the envelope stuffing station 140.

The job mode is switched between an ON or OFF mode by an operator. When ON, the selected dynamic speed control algorithm is active for the current job. When OFF, no dynamic speed control algorithm is active for the current job, and the inserter or wrapper system runs in normal mode under the control of the operator. In a simple minimum speed mode, a minimum speed is selected for the current job. An operator has the ability to turn up the speed of the mail processing system 100. In a simple maximum speed, a maximum speed is selected for the current job. The operator has the ability to turn up the speed of the mail processing system 100, but cannot exceed the maximum value.

With respect to material availability, the mail processing system 100 runs at a minimum speed or the speed the operator has specified until the mail processing system 100 receives a hopper 110-115 low notification or a conveyor 160 almost full notification. Once the dynamic speed control receives an indicator/notification event it will reduce the speed of the mail processing system 100 to a preset percentage of the current speed. The percentage will be configurable at job setup time. Once the low or almost full indicator/notification is cleared, the mail processing system 100 will run at its original speed.

A page count threshold and slow insertion speed can be selected for the current job. When a mail piece with a page count that is equal to or greater than the page count threshold reaches the stuffing station 140, the mail processing system 100 slows from its current speed to the preset slow insertion speed. When the stuffing operation is complete, the mail processing system 100 returns to the prior cycling speed. A specific OMR bit mark and slow insertion speed can be selected for the current job. When a mail piece which contains the specified OMR mark reaches the stuffing station, the mail processing system 100 slows from its current speed to the preset slow insertion speed. Sequence numbers 310, barcodes 315 and control codes 305 maybe used control speed selection. Other symbols may be used by those skilled in the art for dynamic speed control. When the stuffing operation is complete, the mail processing system 100 returns to the prior cycling speed.

The base track section 195 is configured for optimization. The mail processing system 100 speed is controlled by dynamic speed control to optimize mail processing system 100 speed based on input channel and set size throughput. If the number of filled track sections/sample size is less than Xmin, speed is decreased by Y cycles per hour; if it is greater than Xmax, the speed is increased by Y cycles per hour. Values for "sample size", Xmin percentage, Xmax percentage, Y cycles per hour can be finalized with testing.

In the system dynamic speed control, the inserter or wrapper is responding and making cycle speed adjustments and system level changes based on operational conditions. The dynamic speed control is making adjustments to any of the mail processing equipment components of the mail processing system 100. The mail processing equipment may consist of but is not limited to the input channel 130 and its subsystems 132 through 136 and 127, the base track 105, IFS 110 through 115, stuffing station 140 and the conveyer/stacker 160. Equivalent components of a wrapper are affected by dynamic speed control.

Workflow optimization is now described. Mail processing system 100 speed is controlled by dynamic speed control to maximize mail processing system 100 production by monitoring how well the operator can keep up with the demands to fill hoppers and empty conveyors. If the number of indicator events/sample size is less than Xmin %, the speed is increased by Y cycles hour, if it is greater than Xmax %, the speed is decreased by Y cycles per hour. Appropriate values for "sample size", Xmin percentage, Xmax percentage, Y cycles per hour can be finalized with testing.

Operator alerts are generated for review by the operator of the system. The operator alert function will guide the operator in the optimum workflow of the mail processing system 100. Optional audio or text message will notify the operator when an area of the mail processing system 100 should be attended to. A list of indicators will be presented on the screen with the following options: do nothing, send audio alert and/or send text alert. The indicators on this list will be the same as the indicators in the workflow optimization algorithm with the option to add other inputs. To support this functionality an audio alert hardware kit is provided and includes multiple tones so more than one kit can be used on a mail processing system 100.

Figure 2:
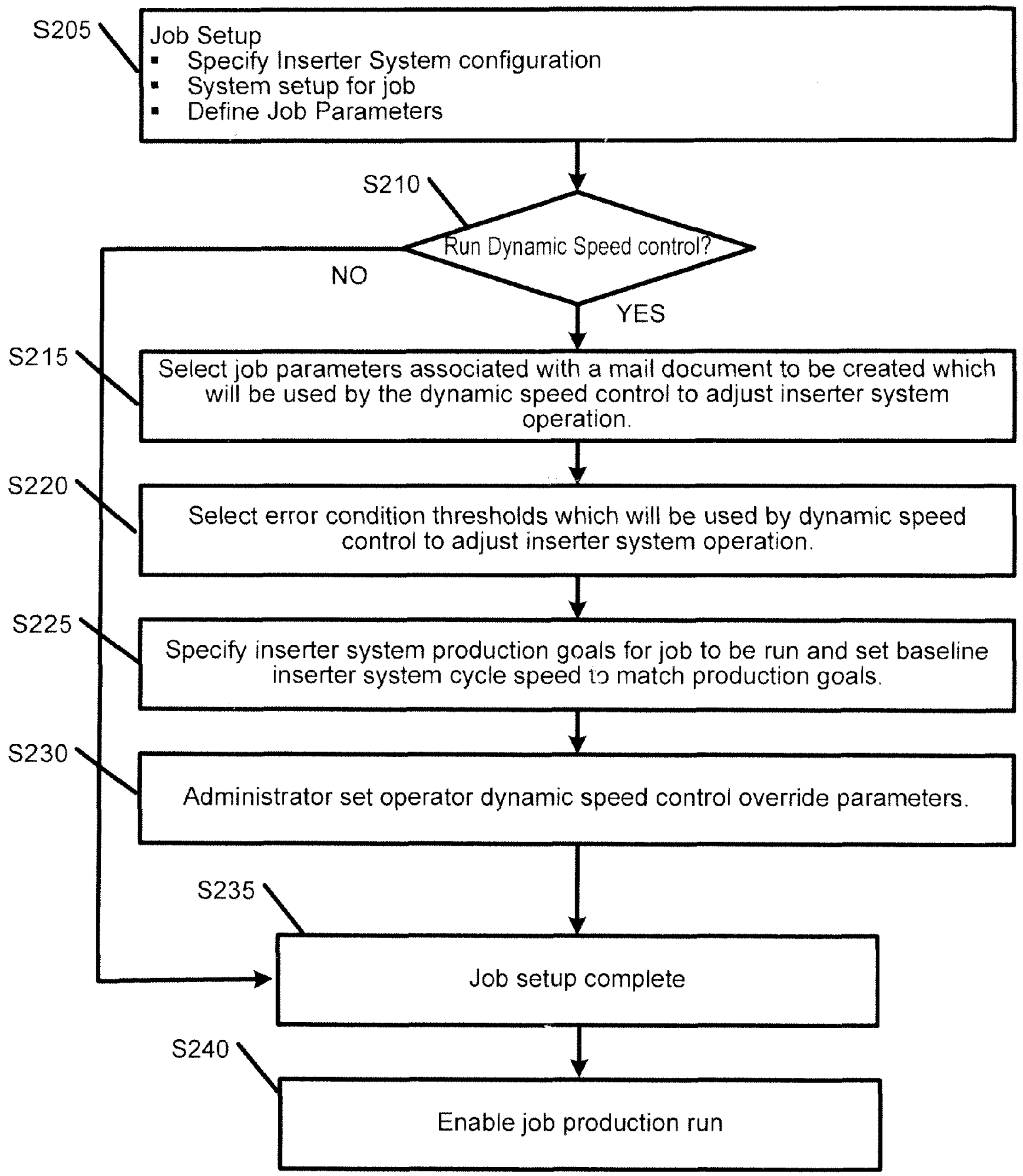
FIG. 2 is an exemplary flow chart for the production job setup process.

Attention is now turned to FIG. 2 for the process steps of the system and job setup. In step S205, the system configuration is defined to the dynamic speed control algorithms. These parameters include, but are not limited to, input channel configuration, number of insert feeder stations and delivery section components. This configuration may not change from job to job on the same machine. Job parameters may be provided by the data center processor 172 or entered by an operator. The job parameters include, but are not limited to, material type, material dimensions, print orientation (portrait or landscape), collection direction, fold type, accumulator mode (over or under) and control code symbology. If dynamic speed control is not enabled S210 job setup is complete S235.

When dynamic speed control is selected the job parameters that will be used by the dynamic speed control algorithms are specified in step S215. These job parameters define characteristics of the material for the inserts and document plus the production steps that must be executed by the inserting system 100 to produce a mail document. The hardware configuration defines whether individual inserting system 100 subsystem components 130, 105, 110-115, 140 and 150 can be adjusted in speed individually or synchronized as a group. The objective of the dynamic speed control is to minimize the cycle slow down required by one of the production steps to just the mail document being assembled and be able to return to the baseline cycle speed in as few cycles as possible. Error thresholds and error types are to be processed by the dynamic speed control are defined in step S220. Generally error rates, such as jam stops, are a factor of cycle speed where faster cycle speed increases the occurrence of error conditions. The error conditions and the frequency of occurrence thresholds are set. The parameters effecting production throughput goals (number of mail documents 300 produced per hour) are set in step S225. These parameters are used to set the baseline cycle speed for the inserting system 100 and its subsystem components. The dynamic speed control algorithms will adjust the baseline cycle speed up or down about the baseline balancing cycle speed with error condition occurrence to achieve the best throughput for the job being run. In step S230 the administrator or operator, optionally under password control, will specify which dynamic speed control parameters can be overridden. Some parameters may be restricted from override if for example, but not limited to, bypassing the dynamic speed control will result in document destruction during a jam stoppage. The resulting need for a document reprint will out way the advantage of a higher cycle speed since total throughput will decrease and job integrity may be put at risk. The production job is now ready to run and is enabled in step S240.

The parameters used in steps S215, S220, S225 and S230 may be operator entered or downloaded from the data center processor 172 into the control computer 170. Many jobs are repeated monthly or quarterly and have the same physical properties therefore historical data can be used for setup.

Figure 4:
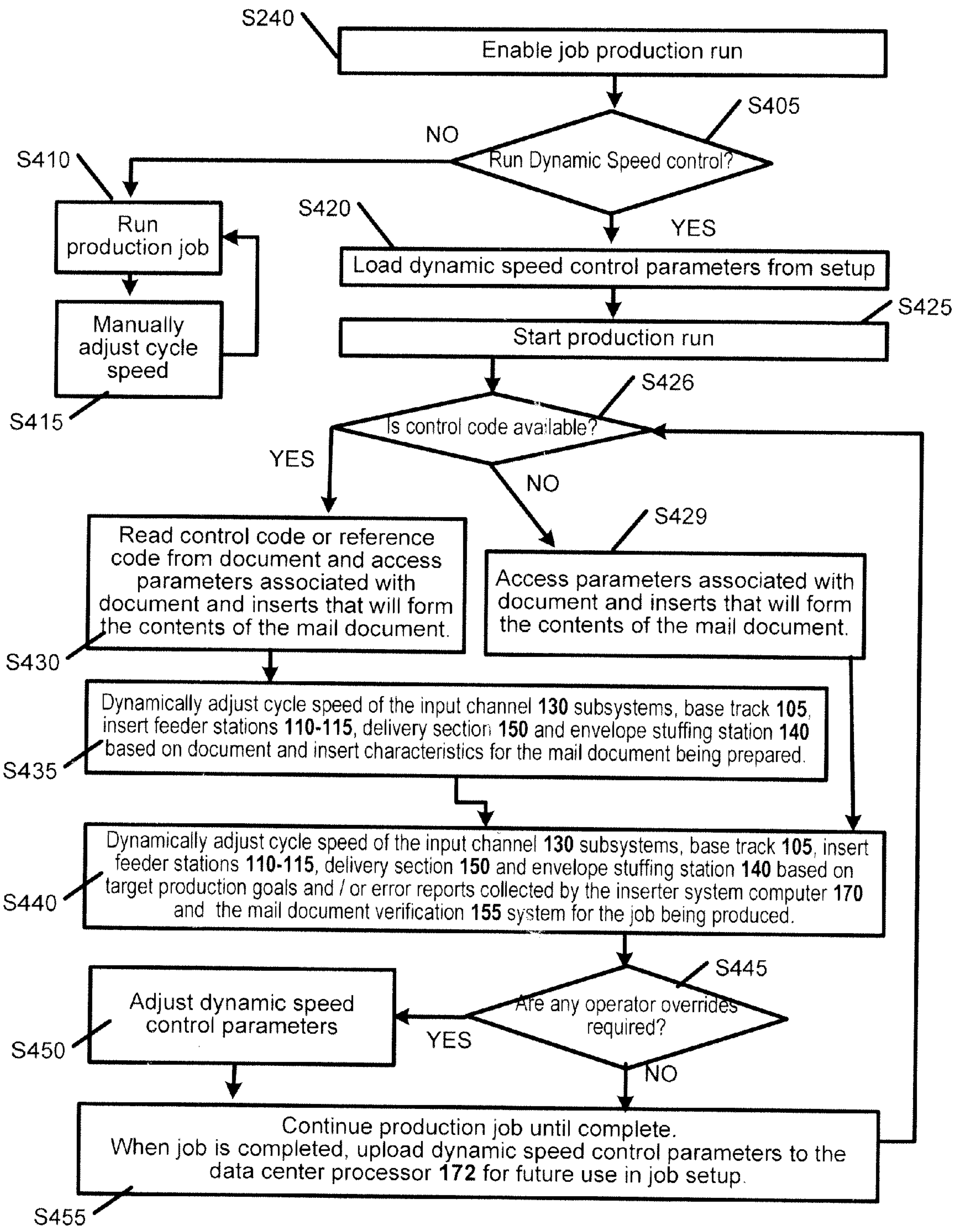
FIG. 4 is an exemplary flow chart for the dynamic speed control.

Attention is now directed to FIG. 4 for a description of the production steps associated with dynamic speed control on a document processing system. In this example, the job has been enabled S240, but dynamic speed control may not be selected S405. For this example, the manual control associated with the conventional methods will be run (steps S410 and S415). However, when dynamic speed control is selected S405, the dynamic speed control parameters from setup are downloaded to the run time control processor S420 and production is started S425. If control codes are not printed on the document S426, the job parameters associated with the documents and inserts that will be stuffed into an envelope are still downloaded S429 since fixed cycle speeds base on production goals and dynamic cycle speeds based on error conditions are processed in step S440. When the control code or reference code is available on the document it is read by the control code reader 133 and decoded for instructions or the unique reference code is read by reader 133 and used to reference a data file where the instructions can be retrieved S430. Since information is available about the intended material contents of the mail document about to be manufactured, control instructions for each subsystem component are dynamically provided to the correct subsystem component(s) as the mail document contents are advanced and tracked through the document processing system 100 by the system control processor 170 which is running dynamic speed control S435. These control instructions adjust cycle speed but the instructions are not limited to just speed. For example, the size of the envelope opening by the stuffing station may be varied to reduce jam errors. The subsystem components affected include but are not limited to the input channel 130 subsystems, base track 105, insert feeder stations (IFS) 110-115, delivery section 150 and envelope stuffing station 140. Further incremental dynamic control adjustments are made to the system 100 subsystems based on historical error conditions accumulated during the job run S440. These adjustments are made around the baseline cycle speed established by target production goals S440. If enabled S445, the operator may adjust parameters associated with dynamic speed control or adjust production targets S450. The production process continues until all mail documents 300 are completed S455. Dynamic speed control is run on numerous material sets simultaneously since multiple documents are in the input section 130 at the same time and each track section 128 contains a document and inserts. The dynamic speed control algorithms use control code data and tracking data to ensure that control chances indicated for one mail document being created do not adversely effect production of other mail document material sets being processed by another subsystem. When the job is completed, historical data related to the dynamic speed control parameters are compiled and transferred to the data center processor 172 to be used to adjust the setup parameters for the next time the job is run S455.

As shown by the above discussion, functions relating pertain to the operation of an inserting system wherein dynamic speed control is implemented in the hardware and controlled by one or more computers operating as the control processor 170 connected the inserting system and to a data center processor/server 172 for data communication with the processing resources as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the control processor 170 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

Figure 6:
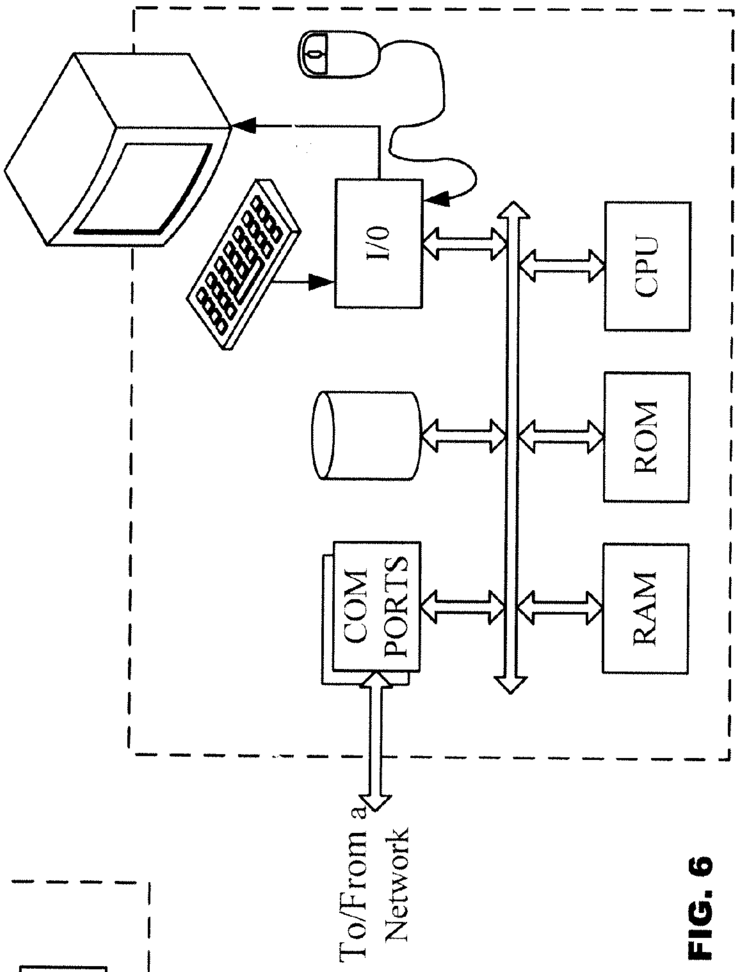
FIG. 6 depicts a computer with user interface elements, as may be used to implement a personal computer or other type of work station or terminal device.
Figure 5:
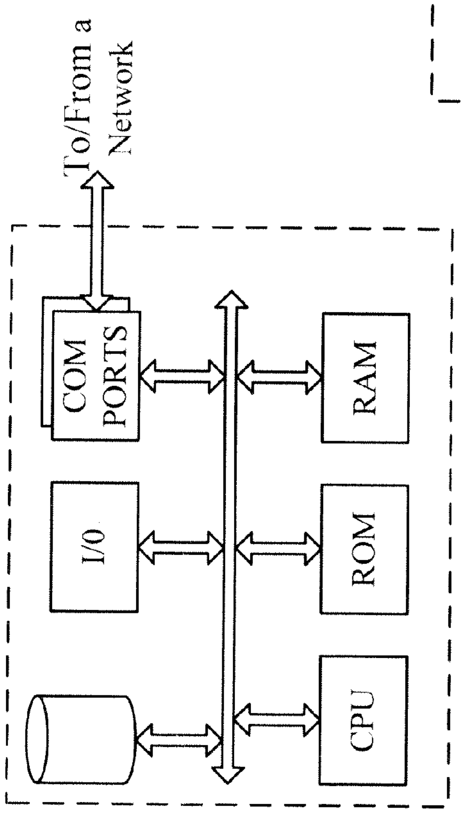
FIG. 5 illustrates a network or host computer platform, as may typically be used to implement a server.

FIGS. 5 and 6 provide functional block diagram illustrations of general purpose computer hardware platforms. FIG. 5 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and, as a result, the drawings should be self-explanatory.

For example, control processor 160 may be a PC based implementation of a central control processing system like that of FIG. 5, or may be implemented on a platform configured as a central or host computer or server like that of FIG. 6. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium, "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An automated method for dynamically controlling cycle speed on a mail processing system during a mail production job, the method comprising steps of:

loading dynamic cycle speed control parameters onto the mail processing system, the dynamic cycle speed control parameters obtained during setup of the mail production job;

initializing the mail production job on the mail processing system, the mail production job comprising a plurality of document materials to be assembled into a plurality of mail documents;

reading a reference code or control code from at least one of the document materials for accessing control instructions for at least one mail processing equipment component of the mail processing system during assembly of the at least one document material into a mail document; and dynamically adjusting cycle speed of the at least one mail processing equipment component based on one or more of: characteristics of the at least one document material during assembly, target production goals of the mail production job, or mail production job error information collected during assembly of the at least one document material by one or more of the mail processing equipment components.

2. The method according to claim 1, wherein the dynamic adjustment step includes dynamically providing control instructions to a plurality of the mail processing equipment components as the at least one document material is advanced and tracked through the mail processing system.

3. The method according to claim 1, wherein the dynamic adjustment step includes increasing or decreasing cycle speed of one or more of the mail processing equipment components selected from: a delivery section, inserting station, envelope stuffing or wrapping station, base track, or input channels of an accumulator, folder or collector.

4. The method according to claim 1, further comprising the step of:

adjusting a size of an envelope opening during insertion of the at least one document material into an envelope at a stuffing station.

5. The method according to claim 1, wherein the reading step includes either:

reading the control code printed on the at least one document by an optical reader; or reading the reference code printed on the at least one document material by an optical reader.

6. The method according to claim 1, further comprising the step of:

receiving operator override instructions for adjusting one or more dynamic speed control parameters or target production goals.

7. The method according to claim 1, further comprising the step of:

upon completion of the mail production job, uploading historical data relating to the dynamic speed control parameters accumulated during the mail production job run, to a computer of the mail processing system for use in setup of an additional mail production job.

8. The method according to claim 1, wherein the initializing step includes starting operations of an inserting or wrapping system for assembly of the plurality of document materials into the plurality of mail documents.

9. The method according to claim 1, wherein the dynamic adjustment step includes:

adjusting cycle speeds of a plurality of the mail processing equipment components individually; or synchronizing cycle speeds of a plurality of the mail processing equipment components.

10. A non-transitory computer readable medium embodying a program, wherein execution of the program causes a computer to implement the method of claim 1.

11. An automated method for dynamically controlling cycle speed on a mail processing system during a mail production job, the method comprising steps of:

loading dynamic cycle speed control parameters onto the mail processing system, the dynamic cycle speed control parameters obtained during setup of the mail production job;

initializing the mail production job on the mail processing system, the mail production job comprising a plurality of document materials to be assembled into a plurality of mail documents;

acquiring one or more job parameters associated with at least one of the document materials for generating control instructions for at least one mail processing equipment component of the mail processing system during assembly of the at least one document material into a mail document;

dynamically adjusting cycle speed of the at least one mail processing equipment component based on one or more of: characteristics of the at least one document material during assembly, target production goals of the mail production job, or mail production job error information collected during assembly of the at least one document material by one or more of the mail processing equipment components; and upon completion of the mail production job, uploading historical data relating to the dynamic speed control parameters accumulated during the mail production job run, to a computer of the mail processing system for use in setup of an additional mail production job.

12. The method according to claim 11, wherein the dynamic adjustment step includes increasing or decreasing cycle speed of one or more of the mail processing equipment components selected from: a delivery section, inserting station, envelope stuffing or wrapping station, base track, or input channels of an accumulator, folder or collector.

13. The method according to claim 11, further comprising the step of adjusting a size of an envelope opening during insertion of the at least one document material into an envelope at a stuffing station.

14. The method according to claim 11, wherein the dynamic adjustment step includes dynamically providing control instructions to a plurality of the mail processing equipment components as the at least one document material is advanced and tracked through the mail processing system.

15. The method according to claim 11, further comprising the step of:

receiving operator override instructions for adjusting one or more dynamic speed control parameters or target production goals.

16. The method according to claim 11, wherein the initializing step includes starting operations of an inserting or wrapping system for assembly of the plurality of document materials into the plurality of mail documents.

17. The method according to claim 11, wherein the dynamic adjustment step includes:

adjusting cycle speeds of a plurality of mail processing equipment components individually; or synchronizing cycle speeds of a plurality of mail processing equipment components.

18. A non-transitory computer readable medium embodying a program, wherein execution of the program causes a computer to implement the method of claim 11.

19. A mail processing system configured with dynamic cycle speed control, the system comprising:

a mechanism for transporting a plurality of document materials along a plurality of mail processing equipment components positioned along the mechanism, the mail processing equipment components configured to assemble the plurality of document materials into a plurality of mail documents;

a control processor configured to receive dynamic cycle speed control parameters obtained during setup of a mail production job to be run on the mail processing system; and an optical reader for reading a control code or reference code from at least one of the document materials for accessing control instructions for the mail processing equipment components, wherein the control processor is configured to dynamically adjust cycle speed of the mail processing equipment components individually or collectively based on one or more of: characteristics of the at least one document material during assembly, target production goals of the mail production job, or mail production job error information collected during assembly of the at least one document material by the mail processing equipment components.

20. The system of claim 19, wherein the mail processing system comprises an inserting or wrapping system.

21. The system of claim 19, wherein the mail processing equipment components are selected from the group consisting of: a delivery section, inserting station, envelope stuffing or wrapping station, base track, and input channels of an accumulator, folder or collector.

22. The system of claim 19, wherein the processor is configured to dynamically provide control instructions to the plurality of mail processing equipment components as the at least one document material is advanced and tracked through the mail processing system.

* * * * *